F. S. KINNEY.
Plug Tobacco.
No. 200,202. Patented Feb. 12, 1878.
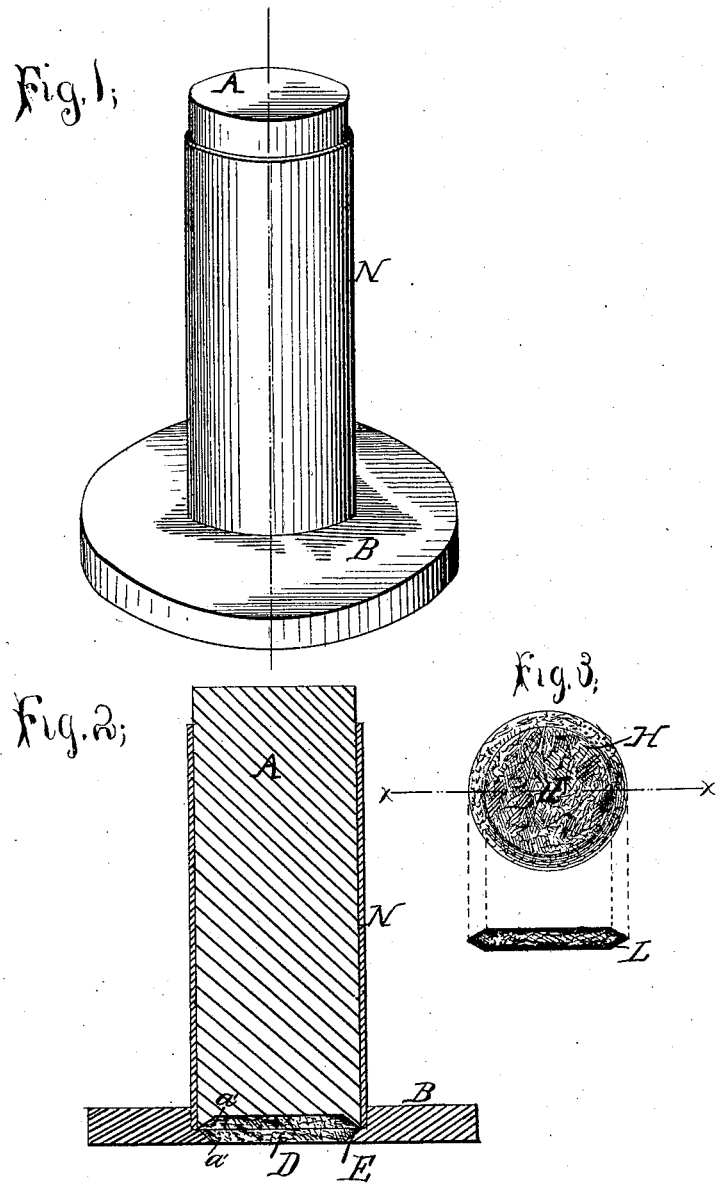

UNITED STATES PATENT OFFICE.

FRANCIS S. KINNEY, OF NEW YORK, N. Y.

IMPROVEMENT IN PLUG-TOBACCO.

Specification forming part of Letters Patent No. 200,202, dated February 12, 1878; application filed December 5, 1877.

*To all whom it may concern:*

Be it known that I, FRANCIS S. KINNEY, of New York, in the county of New York and State of New York, have invented a new and useful Improvement in Manufactured Tobacco, of which the following is a specification, reference being had to the accompanying drawings.

The invention relates to an improved article of manufactured tobacco, and to the means of producing the same.

The object of the invention is to press pieces of tobacco, whether enveloped by a wrapper or not, and thus condense the same into a convenient form for use.

Heretofore plugs or cakes of tobacco have been formed into shape by the operation of pressure; but owing to the fact that, so far as known, certain portions of such cakes or plugs—generally the edges—have not been subjected to direct contact with the pressing medium, the particles, whether inclosed in a wrapper or not, are held at the parts of the cakes indicated in comparatively loose relation, and hence the cake is liable to become worn on its edges, or to disintegrate partially or totally when abraded.

To correct this defect and produce a cake or plug composed of particles of tobacco or any other analogous article capable of being formed into a cake by pressure, that will not disintegrate by abrasion, is the object of this invention, and is consummated by pressing the material into a cake having an inclined edge, so formed by the action of the pressing agent. Thus the pressure is directly applied to the entire exterior surface of the mass, and a hardened case or shell is formed about the center thereof, which will resist abrasion of the cake of tobacco or other article, such as it may be exposed to when carried in the pocket or upon the person.

Referring to the accompanying drawings, Figure 1 is a perspective view of a device containing an incorporation of the elements of the invention. Fig. 2 is a vertical central section of same. Fig. 3 is a plan view of a compressed cake, with a section through the line $x\,x$.

In the accompanying drawings, A B represent, respectively, the upper and lower sections of the die employed, each section provided with the coincident space $a'$, which, when united, form the cavity D, which is of proper size to exactly contain the charge of tobacco when compressed into the cake. About the edges or circumference of the space $a'$ is provided the beveled annulus E, which inclines downward and inward toward the axial center of the space $a'$, the edge or crest of the annulus being made as sharp as practicable, so it may operate to cut off the surplus material.

Obviously the die-spaces $a'$ may be made of any shape desired, and the annulus may form a complete incline or curve from its circumference to the center of the space. The latter formation would, however, produce an article having a curved surface, and which would be inferior, in respect to convenience, to the cake herein set forth.

H represents a cake of compressed tobacco, the center being shown by the letter I, and the exterior shell or hardened case by the letter L. Obviously this cake may have an edge inclined upon one surface, or upon both surfaces, as in the present instance.

The operation of producing the cake is as follows: The desired quantity of tobacco which it is intended the cake shall contain is placed in the cavity of the die, which should be of suitable size to exactly contain the said quantity when pressed into a cake of proper density; or the tobacco may be placed in one of the spaces $a'$. This done, great pressure is brought to bear upon the die, and the material therein is crowded down and outward toward the edges of the cavity, and thus compressed into the beveled cake shown. Now, from the fact that the edges of the space $a'$ are beveled, it is plain that every portion of the exterior of the material comes in direct contact with the pressing-die, and hence that nothing like a raw edge is possible, save, perhaps, an inappreciable line on the extreme edge of the cake, which is too insignificant to deteriorate the result.

Thus there is formed about the center of the cake H an envelope or casing, L, surrounding the center I, which is comparatively unaffected by the pressure, and is hence easily broken, the shell constituting a protection against ordinary abrasion.

The tobacco may, of course, be compressed into a cake of almost any degree of hardness; but preferably it should be manipulated so as to form a cake having an exterior that will not be easily abraded, and which at the same time may be readily broken up for use.

Another means for forming the compressed cake is clearly shown in the drawings, and consists of the upper and lower sections A B of the die employed, and of the section of pipe or casing N, which is set upright in the lower section or base, and the tobacco filled in; then the upper section or plunger A is forced down upon it, forming the cake. The lower section or base B rests on any flat surface, and has one side of the die in it, the other being in the end of the plunger.

What I claim as my invention, and desire to secure by Letters Patent, is—

1. As a new article of manufacture, a cake of tobacco having its edges beveled by compression, substantially as set forth.

2. A die composed of the upper and lower sections A B, having the beveled annulus E, in combination with the tubular casing N, substantially as and for the purpose set forth.

In testimony that I claim the improvement in manufactured tobacco, as hereinbefore described, I have hereunto set my hand this 3d day of December, 1877.

FRANCIS S. KINNEY.

Witnesses:
WM. MILNE, Jr.,
H. H. O. HOUGHTON.